Patented Aug. 22, 1933

1,923,226

UNITED STATES PATENT OFFICE 1,923,226

PROCESS FOR THE PURIFICATION OF BLUE VAT DYESTUFFS

Paul Nawiasky, Ludwigshafen - on - the - Rhine, Germany, assignor to General Aniline Works Inc., New York, N. Y., a Corporation of Delaware No Drawing. Application March 28, 1929, Serial No. 350,811, and in Germany April 7, 1928

1 Claim. (Cl. 260—31)

The present invention relates to the purification of greenish blue to blue vat dyestuffs fast to chlorine.

It is known that by fusion with caustic alkali of 2-aminoanthraquinone a blue vat dyestuff is obtained, the essential constituent of which is N-dihydro-1.2.1'.2'-anthraquinoneazine. However, by most methods of production, a product is obtained which is not pure and contains constituents impairing the properties of the product by reducing its fastness to chlorine.

Attempts have already been made to overcome this drawback. Thus, in the U. S. Patent No. 1,541,156 it has been suggested to produce N-dihydro-1.2.1'.2'-anthraquinoneazine fast to chlorine, either by fusing pure β-aminoanthraquinone with caustic alkali metal hydroxide, or else by starting with impure β-aminoanthraquinone and eliminating, during the alkali melt, the impurities which cause the imperfect fastness to chlorine, by prolonging the duration of the melt or, instead of destroying them during the alkali melt, eliminating them from the finished dyestuff by a repeated alkali melt, or by one or more fractional precipitations from sulphuric acid, and the like. Since the destruction or elimination of the impurities in this manner is always accompanied by the destruction or elimination of larger or smaller amounts of the valuable dyestuff fast to chlorine, the said process is accompanied by losses of the desired N-dihydro-1.2.1'.2'-anthraquinoneazine.

I have now found that N-dihydro-1.2.1'.2'-anthraquinoneazine can be produced on an industrial scale with the same purity and fastness to chlorine as by the aforesaid process according to the U. S. Patent No. 1,541,156 and in a substantially more advantageous manner, by treating N-dihydro-1.2.1'.2'-anthraquinoneazine which is not fast to chlorine, with manganese dioxide, or other oxidizing agents having a similar action, in the presence of sulphuric acid. Suitable oxidizing agents are, for example, all higher oxides of manganese than manganous oxide MnO. The sulphuric acid used may contain a moderate amount of water, such as 15 per cent or less, but not more than about 33 per cent of water; we may also use with the same result ordinary commercial concentrated sulphuric acid having a content of about 96 per cent of sulphuric acid, or acid free from water, such as sulphuric acid monohydrate, or even weak oleum, up to oleum containing 25 per cent of $SO_3$. All sulphuric acids of a concentration within the said limits are to be regarded as equivalents for the purposes of the present invention, and I shall therefore hereinafter simply speak of "sulphuric acid". By the aforesaid treatment the impurities which cause the lack of fastness to chlorine are destroyed, whereas the N-dihydro-1.2.1'.2'-anthraquinoneazine is left practically unaffected.

The aforesaid process is applicable to any kind of impure N-dihydro-1.2.1'.2'-anthraquinoneazine and is particularly suitable for the treatment of the mixture of dyestuffs obtained by the alkali fusion of β-aminoanthraquinone in the presence of certain additions, as specified for example in the U. S. Patent No. 746,784 and other patents well-known to those familiar with the said reaction. It is not necessary to previously separate the dyestuff B and the other accompanying substances as referred to in the U. S. Patent No. 724,789. According to the amount and the quality of the manganese dioxide employed and the duration and temperature of the reaction, a very valuable dyestuff is obtained which, as regards purity, practically corresponds to the dyestuff A of the aforesaid U. S. Patent No. 724,789.

The purity of the final product can be still further improved by choosing energetic conditions in the production of the crude dyestuff mixture, for example, by lengthening the duration of the fusion, or by passing over air during the fusion, and in this manner part of the impurities ordinarily present is decomposed in the fusion.

The process according to my present invention is also particularly suitable for the further working up of the products obtainable to the copending application for patent Ser. No. 229,258, filed October 27, 1927 (now Patent No. 1,790,109).

In a similar manner the process of my present invention is applicable to those derivatives of N-dihydro-1.2.1'.2'-anthraquinoneazine which contain one or more methyl groups in one or both of the anthraquinone nuclei. For example, by subjecting the easily accessible 3.3'-dimethyl-N-dihydro-1.2.1'.2'-anthraquinoneazine to the described treatment the fastness to chlorine and the purity are improved and the shade becomes more greenish.

The dyestuffs obtained according to my invention first in the form of the azines can be reduced in the manner already known to N-dihydro-1.2.1'.2'-anthraquinoneazines, for example, by dissolving in sulphuric acid and reducing by means of phenols. Moreover, this reduction can be carried out together with the purification in one operation.

In the same way also sulphonic acids of N- dihydro-1.2.1'.2'-anthraquinoneazine and in particular the greenish-blue dyestuff obtainable according to the process of the U. S. Patent No. 970,878 which is considered to be an impure sulphonic acid derived from N-dihydro-1.2.1'.2'-anthraquinoneazine can be subjected to this process. Thereby purer products are obtained the dyeings of which on cotton no longer change to yellow green or yellow when treated with chlorine. The treatment with oxidizing agents may be combined in one operation with the manufacture of the sulphonic acid which serves as the initial material, and, if desired, the yellowish sulphonic acid formed which is in the azine form may be converted into the hydroazine form by treatment with reducing agents, for example, with phenols in solution in sulphuric acid.

The pure sulphonic acids thus obtainable can also be prepared by treating pure N-dihydro-1.2.1'.2'-anthraquinoneazine fast to chlorine, such as is obtainable by the process according to the U. S. Patent No. 1,541,156 or by the process hereinbefore described with mild sulphonating agents, preferably in the presence of boric acid. By the term "mild sulphonating agent" I mean milder sulphonating agents than fuming sulphuric acid with a high content in $SO_3$, such as for example oleum with 10 per cent of $SO_3$, sulphuric acid monohydrate or ordinary commercial concentrated sulphuric acid.

The pure sulphonic acids obtainable as aforedescribed and also the products obtainable by the process of the U. S. Patent No. 948,204 (which process consists in heating crude N-dihydro-1.2.1'.2'-anthraquinoneazine with mild sulphonating agents preferably in the presence of boric acid) have the disadvantage of giving dyeings on cotton from the vat which have only moderate depth of color. I have found that this difficulty can be overcome and that valuable blue vat dyestuffs which have extremely valuable properties in the dyeing and printing industries, in particular valuable color tones, good fastness to light and good strength are obtained when the said sulphonic acids are mixed with N-dihydro-1.2.1'.2'-anthraquinoneazine or substitution products thereof. It is preferable to employ N-dihydro-1.2.1'.2'-anthraquinoneazine and the substitution products thereof in as pure a form as possible, for example in the form obtainable according to the U. S. Patent No. 1,541,156 or the process hereinbefore described, since these products have especially good fastness properties in the pure form, and this is also advantageously noticeable in the properties of the said mixtures.

The following examples will further illustrate the nature of this invention, but the invention is not restricted to these examples. The parts are by weight.

Example 1

10 parts of technically pure N-dihydro-1.2.1'.2'-anthraquinoneazine are dissolved in 176 parts of sulphuric acid of 96 per cent strength and 24 parts of water are added, so that, finally, the water content of the sulphuric acid is about 15 per cent. A suspension of 15 parts of artificial manganese dioxide in 130 parts of sulphuric acid of 85 per cent strength prepared at a temperature below 45° C. is then rapidly added at a temperature below 50° C. The mixture is then slowly raised to 60° to 65° C. and is stirred at that temperature for several hours, until no further purification of the dyestuff occurs. The red-brown to orange suspension is then poured into 1500 parts of water, treated with an addition of 200 parts of a solution of sodium bisulphite, of approximately 38° to 39° Baumé density and heated to boiling for about half an hour, the originally brown yellow suspension turning blue. After filtration and washing until neutral, the dyestuff is made into a paste which gives dyeings that are substantially purer and faster to chlorine, than those of the N-diphydro-1.2.1'.2'-anthraquinoneazine employed as the starting material.

When it is desired to obtain the dyestuff in a particularly finely divided state and in the form of the blue hydroazine, the reaction mixture is not directly poured into water, but 100 parts of fuming sulphuric acid containing 23 per cent of $SO_3$ are added whereby most of the dyestuff precipitated mainly in the form of its oxidation product is dissolved. The dyestuff is then transformed into the hydroazine by the addition of a reducing agent, such as for instance crude carbolic acid, and finally the sulphuric acid solution is poured into water and the precipitate is worked up as usual.

Example 2

25 parts of commercially pure N-dihydro-1.2.1'.2'-anthraquinoneazine are dissolved in 250 parts of sulphuric acid monohydrate, and a suspension of 25 parts of finely powdered natural manganese dioxide in 125 parts of sulphuric acid monohydrate is then added so slowly that the temperature only rises to about 50° C. The whole is then stirred at the same temperature for several hours until no further improvement in the purity of the dyestuff occurs. The further working up of the product is carried out in a manner similar to that described in Example 1.

Example 3

10 parts of the dyestuff obtainable according to the U. S. Patent No. 746,784, but while increasing the duration of the alkali fusion to 4 hours, are stirred into 100 parts of concentrated sulphuric acid of 66° Baumé. Then at a temperature of about 30° C. 5 parts of water are added, and then a suspension of 20 parts of artificial manganese dioxide in 100 parts of sulphuric acid of 63° Baumé is added. The whole is then warmed up to 70° C. and is stirred for 5 hours at this temperature. The dyestuff which is obtained in the form of the azine is converted into N-dihydro-1.2.1'.2'-anthraquinoneazine by reduction, and the product is practically equal in its properties to the dyestuff A described in the U. S. Patent No. 724,789 as regards the purity of its dyeings.

In a similar manner, for example, a dyestuff obtained according to the copending application Ser. No. 229,258, now Patent No. 1,790,109 and in particular according to Example 3 thereof can with advantage be further worked up, in which case it is preferable to lengthen the duration of the alkali fusion to several hours.

A similar result is obtained when natural manganese dioxide is employed instead of artificial manganese dioxide.

Example 4

20 parts of 3.3'-dimethyl-N-dihydro-1.2.1'.2'-anthraquinoneazine are dissolved in 400 parts of sulphuric acid of 65° Baumé. Then a suspension of 80 parts of manganese dioxide in 400 parts of sulphuric acid of 65° Baumé, which has been prepared at a temperature below 50° C. is allowed to flow in. The whole is then slowly heated to from 70° to 80° C., and is kept at this temperature until no further change in color of a dyed sample occurs. The sulphuric acid solution is then slowly poured into 3000 parts of water, 300 parts of a solution of sodium bisulphite of from 38.8° to 39.9° Bé. are then poured in, and the whole is then filtered, washed until neutral and made into a paste. The dyestuff obtained dyes in shades which are much more green and much faster to chlorine than those of the initial material.

The process may also be carried out in concentrated sulphuric acid.

*Example 5*

40 parts of Indanthrene blue (Colour Index, 1924, No. 1107) are introduced into a solution of 10 parts of anhydrous boric acid in 400 parts of sulphuric acid monohydrate and the mixture is heated to 90° C. and kept at this temperature until a sample poured into water gives dyeings on cotton which have the desired greenish blue shade. The whole is then allowed to cool to about 40° C. and 40 parts of water are allowed to flow in. A suspension of 20 parts of native pyrolusite containing about 90 per cent of $MnO_2$ in 100 parts of sulphuric acid of 66° Baumé is then added. The whole is then stirred for from 4 to 6 hours at 60° C. until no further purification occurs. The dyestuff can then be worked up in the usual manner by pouring it into water and filtering. The dyestuff obtained is in the form of a greenish yellow paste, that is in the form of the azine.

If it is desired to obtain the dyestuff as a blue paste, that is as the N-dihydroazine, this is effected by treating the reaction mixture with 320 parts of oleum having an $SO_3$ content of 23 per cent instead of pouring it into water as already described so that the partly separated azine goes into solution. Then in order to convert the azine, which is now mostly in solution, into the dihydroazine, a sufficient quantity of a reducing agent, for example crude carbolic acid, is added, so that a sample poured into water produces a clear blue paste. About 10 parts of crude carbolic acid, for example, are necessary. The sulphuric acid solution is poured into water and worked up in the usual manner. The dyestuff obtained dyes cotton very clear greenish-blue shades which are fairly fast to chlorine.

*Example 6*

10 parts of N-dihydro-1.2.1'.2'-anthraquinoneazine which, as regards its purity, corresponds to the commercial Indanthrene blue RS, are introduced at from 30° to 40° C. into a solution of 10 parts of anhydrous boric acid in 150 parts of sulphuric acid monohydrate and the whole is heated at about 120° C. until a sample taken out is for the most part soluble in a from 20 to 25 per cent aqueous solution of pyridine, which is usually the case after about 4 hours. The whole is then cooled to about 30° C. and 8 parts of water and then a suspension of 5 parts of finely ground pyrolusite in 25 parts of concentrated sulphuric acid are allowed to flow in, the whole being then heated to 55° C. and stirred at from 55° to 60° C. until no further improvement in the fastness to chlorine of the dyeings from a sample taken out and worked up can be detected. This is usually the case after about 5 hours. The whole is then diluted with 100 parts of concentrated sulphuric acid, and cooled to from 30° to 40° C. Crude phenol is then introduced until a sample taken out and diluted with water gives a blue suspension. The whole is then poured into water, washed with hot water and worked up in the manner already known. The dyeings on cotton obtained from a warm hydrosulphite vat of the product are greenish blue and when treated with chlorine they only show a slight change to blue green.

*Example 7*

10 parts of pure N-dihydro-1.2.1'.2'-anthraquinoneazine fast to chlorine, prepared for example according to Example 4 of the U. S. Patent No. 1,541,156, are introduced into a solution of 10 parts of anhydrous boric acid in 150 parts of sulphuric acid monohydrate at a temperature of from 30° to 40° C. and the whole is heated to 120° C. while stirring well. The whole is then stirred at this temperature until a sample taken out dissolves almost entirely in a from 20 to 25 per cent aqueous solution of pyridine, which is usually the case after about from 4 to 5 hours. 1,500 parts of warm water, at a temperature of 60° C. are then stirred in and the whole is heated to boiling for a period of from ½ to 1 hour until the original greenish shade no longer changes to blue. The product is filtered off, washed with warm water and worked up in the usual manner. The dyestuff agrees, as regards all its properties, with that obtainable according to the foregoing example.

*Example 8*

57.5 parts of the N-dihydro-1.2.1'.2'-anthraquinoneazine fast to chlorine obtainable according to Example 4 of the U. S. Patent No. 1,541,156, are mixed with 42.5 parts of the sulphonic acid of the same dyestuff obtainable according to Example 6 or 7. This mixture, from a warm hydrosulphite vat, gives on cotton shades having the same fastness properties as the greenish blue dyestuff obtainable for example by heating pure N-dihydro-1.2.1'.2'-anthraquinoneazine with sulphuric acid in the presence of boric acid.

*Example 9*

87.5 parts of pure monochlor-N-dihydro-1.2.1'.2'-anthraquinoneazine, obtainable for example by acting with hydrogen chloride on a suspension of pure 1.2.1'.2'-anthraquinoneazine in sulphuric acid containing some water at an elevated temperature are mixed with 12.5 parts of the sulphonic acid employed in Example 8. A dyeing on cotton with this mixture from a warm hydrosulphite vat corresponds approximately to the dyeings obtained according to Example 8, but is superior to these as regards fastness to chlorine and soaping.

What I claim is:

The process for the purification of greenish blue to blue vat dyestuffs fast to chlorine which comprises treating an impure substance, selected from the group consisting of N-dihydro-1.2.1'.2'-anthraquinoneazine and its methyl and sulphonic acid derivatives, with manganese dioxide in sulphuric acid.

PAUL NAWIASKY.